US011993506B2

(12) United States Patent
Wu et al.

(10) Patent No.: US 11,993,506 B2
(45) Date of Patent: *May 28, 2024

(54) METHOD, DEVICE AND SYSTEM FOR AUTOMATICALLY FUELING VEHICLE

(71) Applicant: Beijing Tusen Weilai Technology Co., Ltd., Beijing (CN)

(72) Inventors: Nan Wu, Beijing (CN); He Zheng, Beijing (CN)

(73) Assignee: BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,500

(22) Filed: Nov. 17, 2022

(65) Prior Publication Data

US 2023/0081898 A1 Mar. 16, 2023

Related U.S. Application Data

(63) Continuation of application No. 16/035,669, filed on Jul. 15, 2018, now Pat. No. 11,505,445.

(30) Foreign Application Priority Data

Jul. 21, 2017 (CN) .......................... 201710602462.4

(51) Int. Cl.
*B67D 7/04* (2010.01)
*B67D 7/14* (2010.01)
(Continued)

(52) U.S. Cl.
CPC ........... *B67D 7/0401* (2013.01); *B67D 7/145* (2013.01); *G01C 21/3415* (2013.01);
(Continued)

(58) Field of Classification Search
CPC .. B67D 7/0401; B67D 7/145; G01C 21/3415; G01C 21/3469; G01C 21/3697
(Continued)

(56) References Cited

U.S. PATENT DOCUMENTS 6,529,831 B1 3/2003 Smith et al.
6,777,904 B1 8/2004 Degner et al.
(Continued)

FOREIGN PATENT DOCUMENTS

| CN | 104157026 A | 11/2014 |
|---|---|---|
| CN | 104236573 A | 12/2014 |

(Continued)

OTHER PUBLICATIONS

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010; issue published: Oct. 1, 2010.
(Continued)

*Primary Examiner* — Jack K Wang
(74) *Attorney, Agent, or Firm* — Perkins Coie LLP

(57) ABSTRACT

The present application provides a method, device and system for automatically fueling a vehicle. The method includes: determining fuel amount to be filled according to the information of vehicle status and the driving route of the vehicle; assigning a fueling device which conforms to a preset position rule to the vehicle according to the current position of the vehicle and the preset position rule; sending a feedback message carrying position information of the fueling device to the vehicle, so that the vehicle drives to the fueling device indicated by a position of the fueling device; and sending information of the fuel amount to be filled and the information of the identifier of the vehicle to the fueling device so that the fueling device offers fuel to the vehicle (Continued)

indicated by the identifier of the vehicle according to the information of the fuel amount to be filled.

20 Claims, 4 Drawing Sheets

(51) Int. Cl.
   *G01C 21/34* (2006.01)
   *G01C 21/36* (2006.01)
   *G08G 1/0967* (2006.01)
(52) U.S. Cl.
   CPC ..... *G01C 21/3469* (2013.01); *G01C 21/3697* (2013.01); *B67D 2007/0446* (2013.01); *G08G 1/096741* (2013.01)
(58) Field of Classification Search
   USPC ......................................................... 340/438
   See application file for complete search history.

(56) References Cited

U.S. PATENT DOCUMENTS

| | | |
|---|---|---|
| 7,103,460 B1 | 9/2006 | Breed |
| 7,783,403 B2 | 8/2010 | Breed |
| 8,412,449 B2 | 4/2013 | Trepagnier et al. |
| 8,788,134 B1 | 7/2014 | Litkouhi et al. |
| 8,965,621 B1 | 2/2015 | Urmson et al. |
| 9,002,632 B1 | 4/2015 | Emigh |
| 9,111,444 B2 | 8/2015 | Kaganovich |
| 9,134,402 B2 | 9/2015 | Sebastian et al. |
| 9,248,835 B2 | 2/2016 | Tanzmeister |
| 9,315,192 B1 | 4/2016 | Zhu et al. |
| 9,317,033 B2 | 4/2016 | Ibanez-Guzman et al. |
| 9,342,074 B2 | 5/2016 | Dolgov et al. |
| 9,399,397 B2 | 7/2016 | Mizutani et al. |
| 9,438,878 B2 | 9/2016 | Niebla, Jr. et al. |
| 9,476,970 B1 | 10/2016 | Fairfield et al. |
| 9,535,423 B1 | 1/2017 | Debreczeni |
| 9,568,915 B1 | 2/2017 | Berntorp et al. |
| 9,587,952 B1 | 3/2017 | Slusar |
| 9,720,418 B2 | 8/2017 | Stenneth |
| 9,723,097 B2 | 8/2017 | Harris et al. |
| 9,723,099 B2 * | 8/2017 | Chen .................. H04L 67/5682 |
| 9,738,280 B2 | 8/2017 | Rayes |
| 9,746,550 B2 | 8/2017 | Nath et al. |
| 2008/0249667 A1 * | 10/2008 | Horvitz ............... B60W 40/072 701/1 |
| 2008/0275643 A1 * | 11/2008 | Yaqub .................. G01C 21/343 340/995.19 |
| 2009/0040054 A1 | 2/2009 | Wang et al. |
| 2009/0099724 A1 * | 4/2009 | Kranz ..................... G01F 9/008 701/33.4 |
| 2009/0109022 A1 * | 4/2009 | Gangopadhyay .. G01C 21/3679 701/123 |
| 2009/0187416 A1 * | 7/2009 | Baer ..................... G07F 13/025 141/105 |
| 2010/0049397 A1 | 2/2010 | Liu et al. |
| 2011/0313647 A1 | 12/2011 | Koebler et al. |
| 2015/0348335 A1 | 12/2015 | Ramanujam |
| 2016/0139600 A1 | 5/2016 | Delp |
| 2016/0321381 A1 | 11/2016 | English et al. |
| 2016/0375907 A1 | 12/2016 | Erban |
| 2017/0146362 A1 | 5/2017 | Bai et al. |
| 2017/0316635 A1 | 11/2017 | Guo et al. |
| 2018/0025407 A1 | 1/2018 | Zhang et al. |
| 2018/0068497 A1 | 3/2018 | Kurtz et al. |
| 2019/0178664 A1 | 6/2019 | Dudar et al. |

FOREIGN PATENT DOCUMENTS

| | | |
|---|---|---|
| CN | 105550781 A | 5/2016 |
| JP | 2005207859 A | 8/2005 |

OTHER PUBLICATIONS

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions On Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv: 1612.06573v1 (cs.CV) Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dutt, Grauman, Kristen, Active Image Segmentation Propagation·, In Proceedings of the IEEE Conference on Computer Vision and Pattern Recognition (CVPR), Las Vegas, Jun. 2016.

Macaodha, Oisin, Campbell, Neill D.F., Kautz, Jan, Brostow, Gabriel J., "Hierarchical Subquery Evaluation for Active Learning on a Graph". In Proceedings of the IEEE Conference on Computer Vision and Pattern Recognition (CVPR), 2014.

Kendall, Alex, Gal, Yarin, What Uncertainties Do We Need in Bayesian Deep Learning for Computer Vision, arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv: 1611.09580v1 [cs.CV] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

(56) References Cited

OTHER PUBLICATIONS

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Search Report dated Jun. 19, 2018 in Chinese Application No. 201710602462.
US Patent & Trademark Office, Non-Final Office Action for U.S. Appl. No. 16/035,669, dated Jun. 27, 2019, 15 pages.
US Patent & Trademark Office, Final Office Action for U.S. Appl. No. 16/035,669, dated Nov. 29, 2019, 18 pages.
US Patent & Trademark Office, Non-Final Office Action for U.S. Appl. No. 16/035,669, dated Apr. 3, 2020, 15 pages.
US Patent & Trademark Office, Final Office Action for U.S. Appl. No. 16/035,669, dated Nov. 12, 2020, 18 pages.
US Patent & Trademark Office, Non-Final Office Action for U.S. Appl. No. 16/035,669, dated Apr. 29, 2021, 19 pages.
US Patent & Trademark Office, Final Office Action for U.S. Appl. No. 16/035,669, dated Sep. 16, 2021, 22 pages.
US Patent & Trademark Office, Non-Final Office Action for U.S. Appl. No. 16/035,669, dated Feb. 17, 2022, 21 pages.
US Patent & Trademark Office, Notice of Allowance for U.S. Appl. No. 16/035,669, dated Jul. 13, 2022, 8 pages.

\* cited by examiner

METHOD, DEVICE AND SYSTEM FOR AUTOMATICALLY FUELING VEHICLE

CROSS-REFERENCES TO RELATED APPLICATIONS

The present application is a continuation of U.S. application Ser. No. 16/035,669, filed Jul. 15, 2018, entitled "METHOD, DEVICE AND SYSTEM FOR AUTOMATICALLY FUELING VEHICLE", and which claims the priority from Chinese Patent Application No. 201710602462.4, filed on Jul. 21, 2017, entitled "METHOD, DEVICE AND SYSTEM FOR AUTOMATICALLY FUELING VEHICLE", which is hereby incorporated by reference in its entirety.

FIELD

The application relates to the intelligent transportation field and particularly to a method, device and system for automatically fueling a vehicle.

BACKGROUND

Generally the fuel consumption of the vehicle is proportional to the weight of the vehicle. The user of the vehicle generally fuels the oil according to experience, and cannot control the weight of the vehicle effectively and achieve the reasonable fuel consumption. For example, in the event that the vehicle is filled with too much fuel, the self-weight of the vehicle may increase, which causes the increased fuel consumption; and in the event that the vehicle is filled with too less fuel, the vehicle may be unable to drive to the destination. Particularly in the application scenario of car rental, intelligent bus management or logistics transportation, how to fill the vehicle with fuel reasonably and effectively and reduce the fuel consumption is a very important consideration factor.

BRIEF SUMMARY

The application provides a method, device and system for automatically fueling a vehicle.

According to one aspect of the present application, some embodiments provide a method for automatically fueling a vehicle, which includes:

receiving, by a fueling management system, a fueling request from the vehicle, wherein the fueling request comprises information of an identifier of the vehicle and information of vehicle status;

determining a current position of the vehicle and a driving route of the vehicle;

determining fuel amount to be filled according to the information of vehicle status and the driving route of the vehicle;

assigning a fueling device which conforms to a preset position rule to the vehicle according to the current position of the vehicle and the preset position rule;

sending a feedback message carrying position information of the fueling device to the vehicle, so that the vehicle drives to the fueling device indicated by a position of the fueling device; and sending information of the fuel amount to be filled and the information of the identifier of the vehicle to the fueling device so that the fueling device offers fuel according to the information of the fuel amount to be filled to the vehicle indicated by the identifier of the vehicle.

According to one aspect of the present application, some embodiments provide a method for automatically fueling a vehicle, which includes:

determining, by a fueling control device in the vehicle, whether the vehicle needs to be filled with fuel;

obtaining information of vehicle status of the vehicle when determining that the vehicle needs to be filled with fuel;

sending a fueling request to a fueling management system, wherein the fueling request comprises information of an identifier of the vehicle and the information of vehicle status;

receiving a feedback message from the fueling management system, wherein the feedback message comprises information of a position of a fueling device; and prompting the vehicle to drive to the fueling device indicated by the position of the fueling device, so that the vehicle obtains fuel offered by the fueling device.

According to one aspect of the present application, some embodiments provide a device for automatically fueling a vehicle, where the device is at a network side and includes a memory, a processor and a transceiver; the memory is configured to store at least one machine executable instruction; the processor is configured to execute the instruction stored in the memory to:

receive, through the transceiver, a fueling request from the vehicle, wherein the fueling request comprises information of an identifier of the vehicle and information of vehicle status;

determine a current position of the vehicle and a driving route of the vehicle;

determine fuel amount to be filled according to the information of vehicle status and the driving route of the vehicle;

assign a fueling device which conforms to a preset position rule to the vehicle according to the current position of the vehicle and the preset position rule;

send, through the transceiver, a feedback message carrying position information of the fueling device to the vehicle, so that the vehicle drives to the fueling device indicated by a position of the fueling device;

send, through the transceiver, information of the fuel amount to be filled and the information of the identifier of the vehicle to the fueling device, so that the fueling device offers fuel according to the information of the fuel amount to be filled to the vehicle indicated by the identifier of the vehicle; and the transceiver is configured to receive and send information according to invoking by the processor.

According to one aspect of the present application, some embodiments provide a device for automatically fueling a vehicle, where the device is in the vehicle and includes a memory, a processor and a transceiver; the memory is configured to store at least one machine executable instruction; the processor is configured to execute the instruction stored in the memory to:

determine whether the vehicle needs to be filled with fuel;

obtain information of vehicle status of the vehicle when determining that the vehicle needs to be filled with fuel;

send, through the transceiver, a fueling request to a fueling management system, wherein the fueling request comprises information of an identifier of the vehicle and the information of vehicle status;

receive, through the transceiver, a feedback message from the fueling management system, wherein the feedback message comprises information of a position of a fueling device;

prompt the vehicle to drive to the fueling device indicated by the position of the fueling device, so that the vehicle obtains fuel offered by the fueling device; and the transceiver is configured to receive and send information according to invoking by the processor.

According to one aspect of the present application, some embodiments provide a system for automatically fueling a vehicle, which includes: a fueling management system, a fueling control device in the vehicle, and a fueling device;

the fueling management system is configured to receive a fueling request from the vehicle, wherein the fueling request comprises information of an identifier of the vehicle and information of vehicle status; determine a current position of the vehicle and a driving route of the vehicle; determine fuel amount to be filled according to the information of vehicle status and the driving route of the vehicle; assign a fueling device which conforms to a preset position rule to the vehicle according to the current position of the vehicle and the preset position rule; send a feedback message carrying position information of the fueling device to the vehicle; and send information of the fuel amount to be filled and the information of the identifier of the vehicle to the fueling device;

the fueling control device in the vehicle is configured to determine whether the vehicle needs to be filled with fuel; obtain information of vehicle status of the vehicle when determining that the vehicle needs to be filled with fuel; send a fueling request to a fueling management system, wherein the fueling request comprises information of an identifier of the vehicle and the information of vehicle status; receive a feedback message from the fueling management system, wherein the feedback message comprises information of a position of a fueling device; and prompt the vehicle to drive to the fueling device indicated by the position of the fueling device; and the fueling device is configured to receive the information of the fuel amount to be filled and the information of the identifier of the vehicle from the fueling management system; and offer the fuel corresponding to the fuel amount to be filled to the vehicle indicated by the identifier of the vehicle.

BRIEF DESCRIPTION OF THE DRAWINGS

The accompanying drawings are used to provide the further understanding of the application and constitute a part of the specification and serve to explain the application together with the embodiments of the application but not limit the application.

FIG. 1b is a flow chart of the operating principle of the system as shown in FIG. 1a;

DETAILED DESCRIPTION OF THE EMBODIMENTS

Figure 1A:
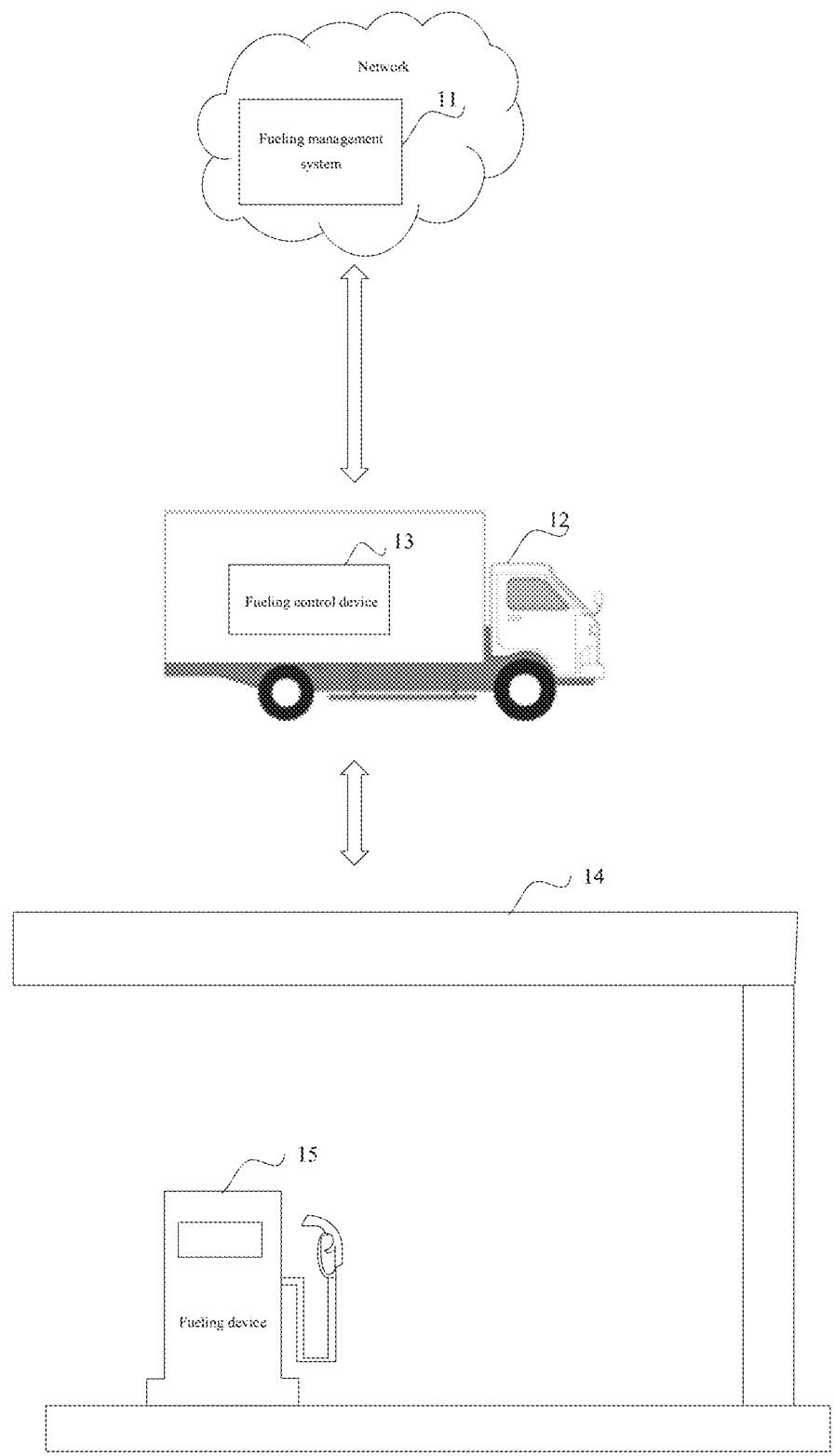
FIG. 1a is a schematic diagram of a system for automatically fueling a vehicle provided by some embodiments of the present application.

In order to make those skilled in the art better understand the technical solution in the application, the technical solution in the embodiments of the application will be described clearly and completely below in combination with the accompanying drawings in the embodiments of the application. Obviously, the described embodiments are just a part of the embodiments of the application but not all the embodiments. Based upon the embodiments of the application, all other embodiments obtained by those ordinary skilled in the art without creative work should pertain to the protection scope of the application.

In order to solve the problem that the fuel amount to be filled of the vehicle cannot be planned reasonably and effectively in the prior art, the embodiments of the application proposes a solution for automatic fueling of the vehicle. According to the scheme of the present application, when determining that the vehicle needs to be filled with fuel, the fueling control device of the vehicle obtains the driving route information and the information of vehicle status of the vehicle, and sends a fueling request to the fueling management system at the network side, where the fueling request includes information of the identifier of the vehicle and the information of vehicle status; the fueling management system determines the current position of the vehicle and the driving route of the vehicle, determines the fuel amount to be filled according to the information of vehicle status and the driving route of the vehicle, assigns a fueling device to the vehicle according to the current position of the vehicle and the preset position rule, feeds back the position information of the fueling device to the vehicle, sends the information of the identifier of the vehicle and the information of the fuel amount to be filled to the fueling device so that the fueling device offers the fuel to the vehicle indicated by the identifier of the vehicle according to the information of the fuel amount to be filled.

In the scheme of the present application, the fueling control device of the vehicle determines the fuel amount to be filled by the vehicle to drive in the driving route according to the driving route information of the vehicle and the information of vehicle status, and sends the information of the determined fuel amount to be filled and the information of the current position of the vehicle to the fueling management system at the network side; the fueling management system assigns a fueling device to the vehicle according to the current position of the vehicle, and sends the information of the fuel amount to be filled to the assigned fueling device; and the fueling device offers the corresponding fuel to the vehicle according to the information of the fuel amount to be filled, which can plan the fuel amount to be filled for the vehicle automatically and effectively and obtain the corresponding fuel, so as to solve the problem that the fuel amount to be filled of the vehicle cannot be planned automatically, reasonably and effectively in the prior art.

According to one aspect of the present application, a system for automatically fueling a vehicle is provided, as shown in FIG. 1a, which includes a fueling management system 11 at the network side, a vehicle 12, and a fueling device 15 in a fuel station 14.

Here, the fueling management system 11 can be an independent control system, or can be deployed in combination with the existing car rental system in a car rental scenario, or can be deployed in combination with the existing fuel station management system in an intelligent fuel station management scenario, or can be deployed in combination with the existing intelligent bus management system in an intelligent bus management scenario, or can be deployed in combination with the existing logistics management system in a logistics transportation management scenario, or can be deployed in combination with the highway port operating center in a highway port management scenario in the prior art, that is, the fueling management system 11 provided by the present application can be deployed in combination with any system of managing the vehicles intelligently. In order to describe clearly the automatic fueling system provided by the present application, the fueling management system is deployed alone as illustrated in FIG. 1a.

The fueling management system 11 can be deployed in a fixed device or can be deployed in a movable or portable device.

The vehicle 12 can be any vehicle which needs to be filled with fuel, such as the vehicle filled with gasoline, diesel, alcohol, liquefied gas or hydrogen, or the fuel cell vehicle. The vehicle 12 can be a vehicle configured with the manual drive mode, automatic drive mode, or unmanned mode.

A fueling control device 13 is included in the vehicle 12. The fueling control device 13 has a memory and a processor. This device 13 can be deployed alone or can be deployed in the navigation device of the vehicle, or can be deployed in the Vehicle to X (V2X) device of the vehicle, or can be deployed in the Human Machine Interface (HMI) device of the vehicle, that is, the fueling control device provided by the present application can be deployed in combination with the control device configured with the structure of memory and processor within the vehicle.

The fueling control device 13 further has the function of communicating with other devices or network resources, for example, the fueling control device 13 can communicate with the corresponding client in the mobile terminal of the user, where the client has a part of or all of the functions of the fueling control device 13. In an embodiment, the client can send the information input by the user to the fueling control device 13; in another embodiment, the client processes the information input by the user and sends the processed result to the fueling control device 13; in yet another embodiment, the client processes the data or instructions from the fueling control device 13 and feeds back the corresponding processed results to the fueling control device 13.

Similarly, the fueling control device 13 can further communicate with a network side device which can also has the corresponding client. The fueling control device 13 can send the data or requests to the network side device, and the network side device or the client in the network side device processes the data or instructions accordingly and feeds back the processed results to the fueling control device 13.

In the case that the fueling control device 13 is deployed alone, the fueling control device 13 can has a transceiver with the wired or wireless communication function, and communicate with other devices and sources through the transceiver. In the case that the fueling control device 13 is configured in combination with another device, the fueling control device 13 can has an interface with the communication function and communicate with other devices in the vehicle via the interface, or invoke the communication device in the vehicle 12 via the interface to communicate with the devices/network resources external to the vehicle 12.

The fueling device 15 is generally a fueling machine or another device or equipment capable of offering the fuel. The fueling device 15 has the communication function, where it can receive the data and/or instructions from the fueling management system 11 and/or the fueling control device 13 in the vehicle 12, process the data and/or instructions, and feedback the corresponding processed results to the fueling management system 11 and/or the fueling control device 13 in the vehicle 12.

Figure 1B:
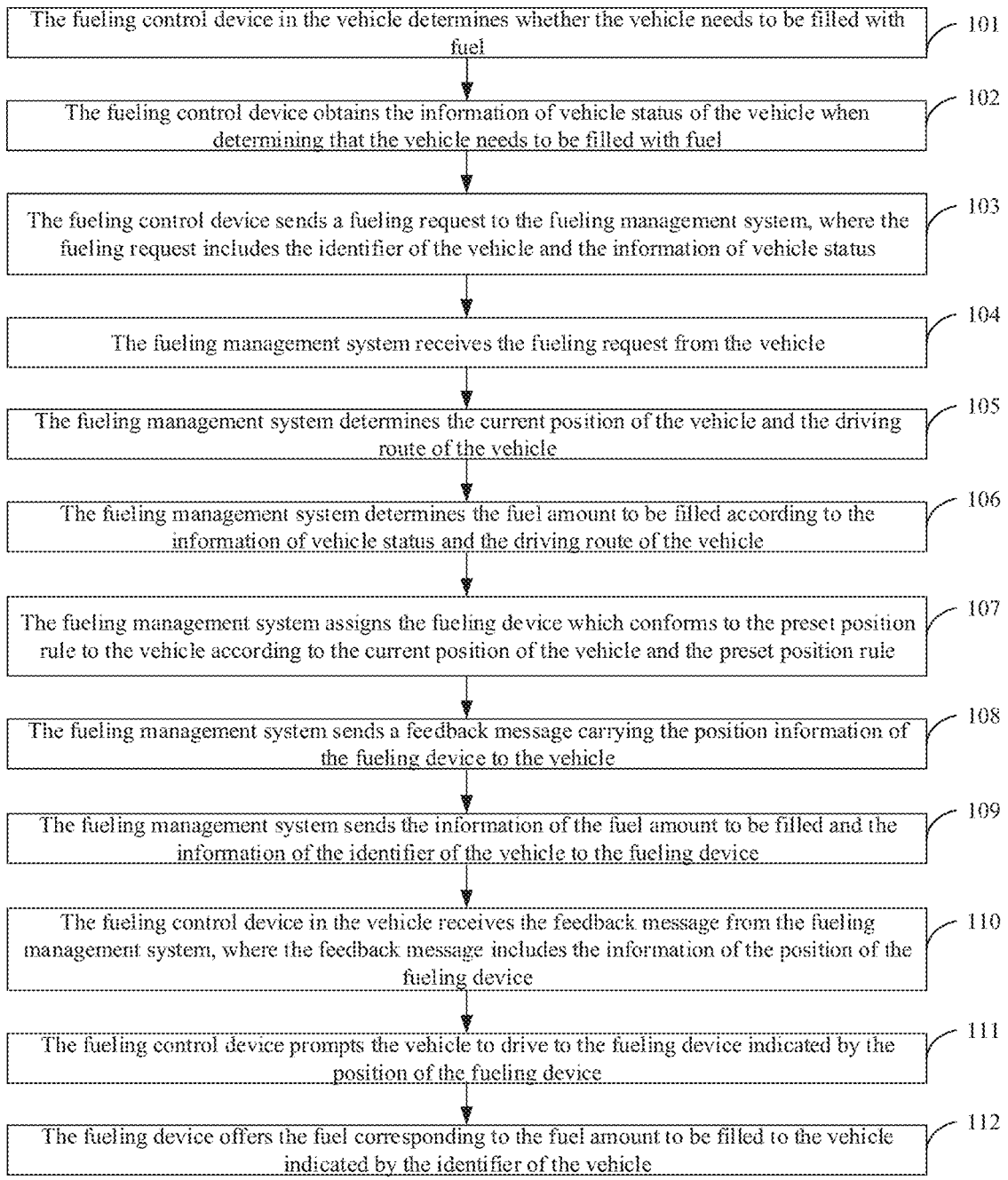

The operating principle of the system as shown in FIG. 1a is as shown in FIG. 1b, which includes:

Step 101: the fueling control device 13 in the vehicle 12 determines whether the vehicle 12 needs to be filled with fuel;

Step 102: the fueling control device 13 obtains the information of vehicle status of the vehicle when determining that the vehicle needs to be filled with fuel;

Step 103: the fueling control device 13 sends a fueling request to the fueling management system, where the fueling request includes information of the identifier of the vehicle and the information of vehicle status of the vehicle;

Step 104: the fueling management system 11 receives the fueling request from the vehicle 12;

Step 105: the fueling management system 11 determines the current position of the vehicle 12 and the driving route of the vehicle 12;

Step 106: the fueling management system 11 determines the fuel amount to be filled according to the information of vehicle status and the driving route of the vehicle;

Step 107: the fueling management system 11 assigns the fueling device which conforms to the preset position rule to the vehicle according to the current position of the vehicle and the preset position rule;

Step 108: the fueling management system 11 sends a feedback message carrying the position information of the fueling device to the vehicle;

Step 109: the fueling management system 11 sends the information of the fuel amount to be filled and the information of the identifier of the vehicle to the fueling device 15;

Step 110: the fueling control device 13 in the vehicle 12 receives the feedback message from the fueling management system 11, where the feedback message includes the information of the position of the fueling device;

Step 111: the fueling control device 13 prompts the vehicle 12 to drive to the fueling device 15 indicated by the position of the fueling device; and Step 112: the fueling device 15 offers the fuel corresponding to the fuel amount to be filled to the vehicle 12 indicated by the identifier of the vehicle.

The operating principles of the fueling management system 11 at the network side and the fueling control device 13 of the vehicle 12 will be illustrated below respectively.

Figure 2:
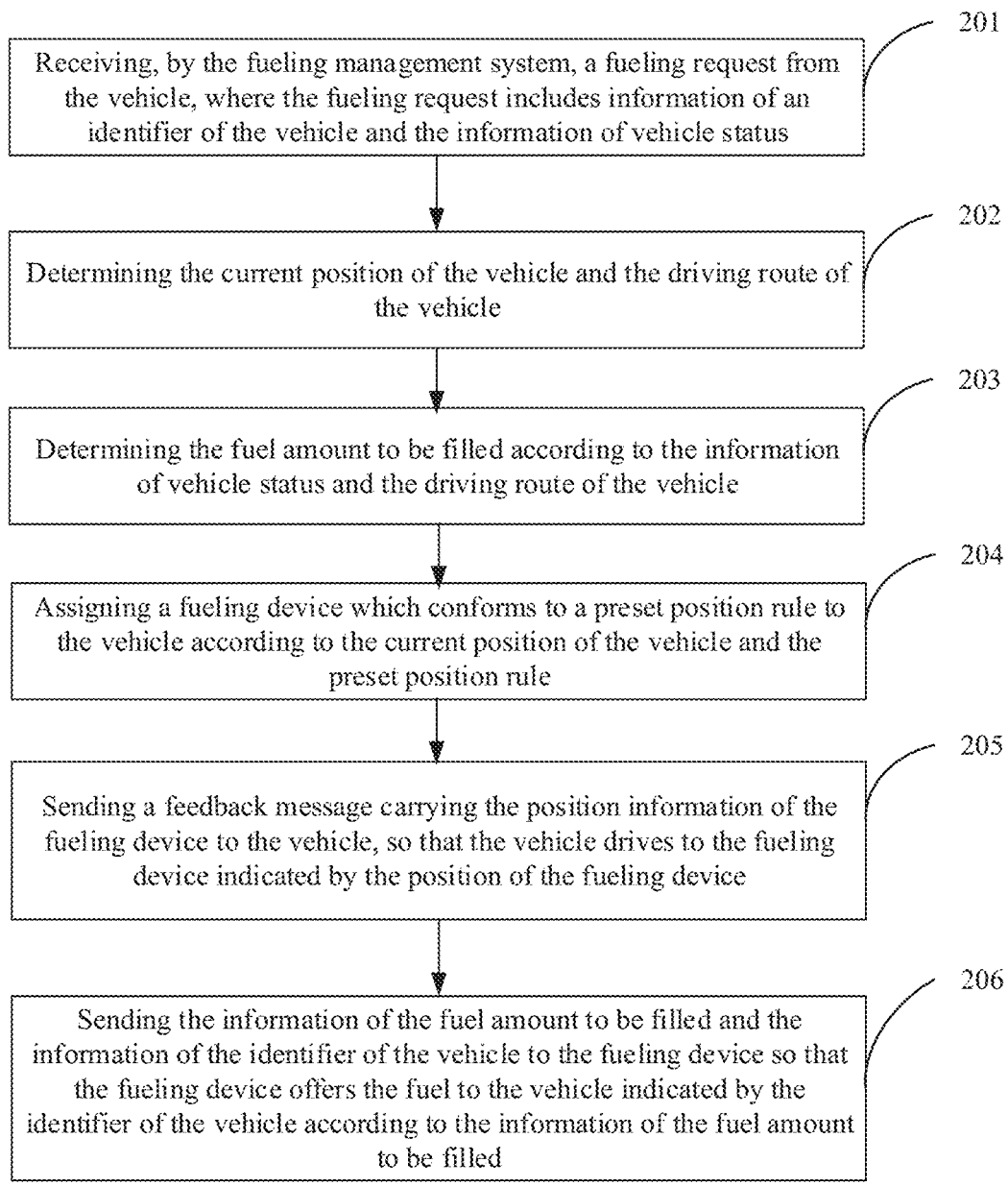
FIG. 2 is a flow chart of a method for automatically fueling a vehicle provided by some embodiments of the present application.

FIG. 2 shows a process of the automatic fueling method provided by the present application. The process shows the operating principle of the fueling management system 11 as illustrated in the FIG. 1a, which includes:

Step 201: receiving, by the fueling management system, a fueling request from the vehicle, where the fueling request includes information of an identifier of the vehicle and the information of vehicle status; the information of vehicle status at least includes: the information of the average fuel consumption per 100 kilometers, the current weight and the filled fuel amount of the vehicle; wherein the average fuel consumption per 100 kilometers of the vehicle can be determined according to the empirical value of the historical data, or can be determined according to the theoretical value, or can be determined according to both the empirical value and the theoretical value.

Where the identifier of the vehicle includes: the vehicle identification code of the vehicle and/or the vehicle identifier assigned by the fueling management system to the vehicle; that is, the identifier of the vehicle can be the Vehicle Identification Number (VIN) which uniquely identifies the vehicle identity, or can be the vehicle identifier assigned by the fueling management system to the vehicle in advance, where the VIN can be the identity number or authentication number used for identification; or can be a combination of the VIN and the application identification number.

Step 202: determining the current position of the vehicle and the driving route of the vehicle.

For the process that the fueling management system determines the current position of the vehicle, if the fueling management system is configured in combination with another vehicle management system, then in order to manage vehicles uniformly and effectively, a GPS positioning tracker is generally mounted on each vehicle, in which case the fueling management system can determine the current position of the vehicle according to the signal fed back from the GPS positioning tracker on the vehicle.

Or, when the fueling management system is not deployed in combination with another vehicle management system and does not manage vehicles uniformly, the fueling management system can send a position request message to the vehicle, and receive the information of the current position of the vehicle fed back from the vehicle.

For the process that the fueling management system determines the driving route of the vehicle, the fueling management system judges whether the current position of the vehicle is included on the prestored historical driving route of the vehicle according to the identifier and the current position of the vehicle.

The prestored driving route can be the route along which the vehicle has driven, and which is recorded. For certain vehicles such as public traffic vehicles, logistics transportation vehicles, private cars for daily commuting and the like, they repeat driving along one or more certain routes. When the fueling control device judges whether the vehicle needs to be filled with fuel, it can further obtain the information relevant to the determined driving route.

In the case that the current position of the vehicle is included on the prestored driving route, if the current position of the vehicle is at one of two ends of the prestored driving route, the prestored driving route is determined as the obtained driving route; if the current position of the vehicle is not at one of two ends of the prestored driving route, the route between the current position of the vehicle and an end of the prestored driving route in the driving direction of the vehicle is determined as the obtained driving route according to the driving direction of the vehicle; wherein the current position of the vehicle is at one of two ends of the prestored driving route, which can be as follows: the current position of the vehicle is roughly at one of two ends, that is, when the current position of the vehicle is in a preset range of one end, the current position of the vehicle is determined to be at one end, where the preset range can be determined according to the actual application scenario. In an example, if the end is a dispatching station of a car rental operator, the area of the whole dispatching station or the area in a certain range around the dispatching station can be determined as the preset range; In another example, if the end is a parking lot, the parking lot and the region in a certain range around the parking lot can be determined as the preset range.

In the case that the current position of the vehicle is not included on the prestored driving route, the fueling management system sends a request of obtaining the driving route to the vehicle and receives the information of the driving route fed back by the vehicle.

Step 203: determining the fuel amount to be filled according to the information of vehicle status and the driving route of the vehicle.

The fueling management system can determine the fuel amount to be filled according to the following processing procedure (which is not shown in the figures):

Step 2031: determining the distance length of the driving route.

When determining the fuel amount to be filled, the required fuel amount of the vehicle can be determined firstly, and then the fuel amount to be filled is determined according to the required fuel amount and the filled fuel amount of the vehicle, wherein the process of determining the required fuel amount can depend on different application scenarios and different factors, which will be illustrated below:

Step 2032*a*: determining the required fuel amount according to a function relationship among the average fuel consumption per 100 kilometers of the vehicle, the current weight of the vehicle and the distance length of the driving route.

This function relationship can be expressed as $y=f(r, s, t)$, wherein y is the required fuel amount, r is the average fuel consumption per 100 kilometers of the vehicle, s is the current weight of the vehicle, and t is the distance length of the driving route.

In another embodiment of the present application, the fueling management system further determines the driving time of the vehicle, where the driving time is the current driving time of the vehicle and can be obtained from the inside of the vehicle.

Then determining the required fuel amount includes:

Step 2032*b*: determining the required fuel amount according to a function relationship among the average fuel consumption per 100 kilometers of the vehicle, the current weight of the vehicle, the distance length of the driving route and the driving time.

This function relationship can be expressed as $y=f(r, s, t, u)$, wherein r is the average fuel consumption per 100 kilometers of the vehicle, s is the current weight of the vehicle, t is the distance length of the driving route, and u is the driving time. In some application scenarios, for example, for the private cars for commuting or public traffic vehicles, the factor of the driving time should be considered when determining the required fuel amount, where the required fuel amount in the rush hour is more than that in other periods.

In another embodiment of the present application, it is further required to obtain the weather condition information. The weather condition information can be obtained from a network resource; and the specific obtaining operation can include: the fueling management system sends a request for obtaining the weather condition to the network resource (e.g., the network resource of weather forecast), and the network resource sends the weather condition information to the fueling management system.

Then determining the required fuel amount includes:

Step 2032*c*: determining the required fuel amount according to a function relationship among the average fuel consumption per 100 kilometers of the vehicle, the current weight of the vehicle, the distance length of the driving route and the weather condition.

This function relationship can be expressed as $y=f(r, s, t, u)$, wherein y is the required fuel amount, r is the average fuel consumption per 100 kilometers of the vehicle, s is the current weight of the vehicle, t is the distance length of the driving route, and u is the parameter representing the weather condition. The reference of the weather condition is preset. In some application scenarios, for example, the rainy weather takes place frequently in the summer, and the snowy weather takes place frequently in the winter. In such weather environment, the vehicle generally needs to drive slowly to ensure the safety, and the weather factor should be considered when determining the required fuel amount.

In another embodiment of the present application, it is further required to obtain the information of roadway condition of the driving route, which includes at least one of: roadway speed limit information, roadway traffic control information, roadway closure information, roadway congestion information. The specific obtaining operation can include: the fueling management system sends a request for obtaining the information of the roadway condition of the driving route to the network resource (e.g., roadway condition broadcast network resource or the like network resource), and the network resource sends the information of the roadway condition of the driving route to the fueling management system.

Then determining the required fuel amount includes:

Step 2032*d*: determining the required fuel amount according to a function relationship among the average fuel consumption per 100 kilometers of the vehicle, the current weight of the vehicle, the distance length of the driving route and the roadway condition of the driving route.

This function relationship can be expressed as $y=f(r, s, t, u)$, wherein y is the required fuel amount, r is the average fuel consumption per 100 kilometers of the vehicle, s is the current weight of the vehicle, t is the distance length of the driving route, and u is the parameter representing the roadway condition. In some application scenarios, most of the vehicles drive slowly when the roadway is congested, thus the required fuel amount when the roadway is congested is more than that when the roadway is clear, and then the roadway condition should be considered when determining the required fuel amount.

In another embodiment of the present application, the information of vehicle status further includes: the information of the deadweight of the vehicle; then the process of determining the required fuel amount includes:

Step 2032*e*: determining the required fuel amount according to a function relationship among the average fuel consumption per 100 kilometers of the vehicle, the current weight of the vehicle, the deadweight of the vehicle and the distance length of the driving route.

This function relationship can be expressed as $y=f(r, s, t, u)$, wherein y is the required fuel amount, r is the average fuel consumption per 100 kilometers of the vehicle, s is the current weight of the vehicle, t is the distance length of the driving route, and u is the deadweight of the vehicle. In some application scenarios, for example, the freight vehicle or public traffic vehicle needs to consider the deadweight condition of the vehicle to ensure the transportation mission can be accomplished successfully. Thus, the deadweight condition of the vehicle needs to be considered when determining the required fuel amount.

In an actual application scenario, one of the function relationships in the steps 2032*a* to 2032*e* can be selected according to the actual demand, or the above function relationships can be combined, or new variables and/or parameters can be introduced into the function relationships, and a detailed description thereof will be omitted here.

In some other embodiments of the present application, the function relationships in the steps 2032*a* to 2032*e* can be updated periodically, where the process of updating the function relationships includes (the following processing procedure is not shown in the figures):

Step 2032*f*: determining the actual fuel consumption after each fueling in a preset update cycle, where the actual fuel consumption can be determined according to the feedback signal from the liquid level sensor of the fuel tank.

Step 2032*g*: comparing the required fuel amount determined each time with the actual fuel consumption.

Step 2032*h*: updating the function relationships for determining the required fuel amount according to the comparison result.

The function relationships for determining the required fuel amount are updated according to the actual fuel consumption condition, and the function relationships can be optimized, so that the required fuel amount which is more accurate is determined according to the updated function relationships subsequently.

Step 204: assigning a fueling device which conforms to a preset position rule to the vehicle according to the current position of the vehicle and the preset position rule.

The fueling management system obtains the prestored position of each of at least one fueling device, and assigns the fueling device which conforms to the preset position rule to the vehicle.

Where the preset position rule includes: a fueling device closest to the current position of the vehicle; or a random fueling device in the at least one fueling device of which the distance from the current position of the vehicle is less than a preset distance; or a fueling device of a pre-determined operator closest to the current position of the vehicle. In a specific application scenario, the position rule can be set according to different requirements, and a detailed description thereof will be omitted here.

In some other embodiments of the present application, the fueling management system further obtains the dynamic operation status information of each of the at least one fueling device, where the dynamic operation status information includes the fueling queue length of the fueling device.

Then the fueling management system assigns the fueling device to the vehicle having the automatic fueling system, which includes: assigning a fueling device which conforms to the preset position rule and of which the fueling queue length is less than the preset fueling queue length to the vehicle, i.e., assigning the fueling device which simultaneously meets these two conditions to the vehicle. For example, a fueling device which conforms to the preset position rule is determined, and when the fueling queue length of the fueling device is greater than the preset fueling queue length, the fueling device is excluded and another fueling device is selected and assigned; further, the fueling management system can further determine the serial number of the vehicle in the fueling queue of the assigned fueling device and the waiting time, and the feedback message further includes: the identifier of the fueling device, the serial number of the fueling queue, and the waiting time.

In a specific application scenario, the fueling device can be assigned to the vehicle according to other factors or conditions, for example, the fueling device can further be assigned according to the unit price of the fuel filled by the fueling device, so as to assign the fueling device to the vehicle more effectively and reasonably.

Step 205: sending a feedback message carrying the position information of the fueling device to the vehicle, so that the vehicle drives to the fueling device indicated by the position of the fueling device.

Step 206: sending the information of the fuel amount to be filled and the information of the identifier of the vehicle to the fueling device so that the fueling device offers the fuel to the vehicle indicated by the identifier of the vehicle according to the information of the fuel amount to be filled.

In some other embodiments of the present application, the fueling management system further determines the payment information corresponding to the fuel amount to be filled, and sends a message including the payment information to the vehicle.

According to the above processing procedure, the fueling management system provided by the present application assigns the fueling device to the vehicle according to the current position of the vehicle, sends the position information of the assigned fueling device to the vehicle, and sends the information of the fuel amount to be filled to the fueling device, so as to achieve the automatic fueling of the vehicle automatically and effectively.

The operating principle of the fueling management system at the network side is illustrated above, and the operating principle of the fueling control device of the vehicle is illustrated below.

Figure 3:
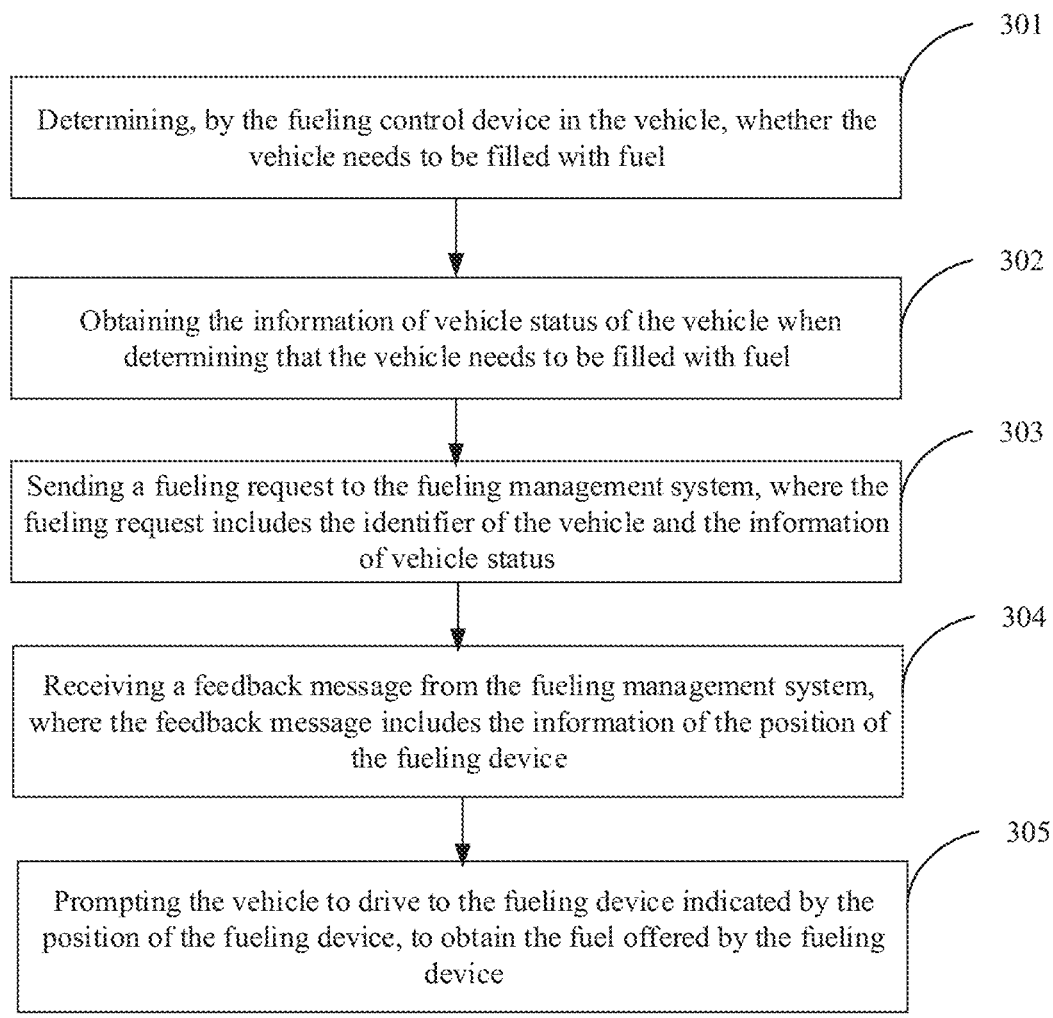
FIG. 3 is a flow chart of a method for automatically fueling a vehicle provided by some embodiments of the present application.

FIG. 3 shows a processing flow of an automatic fueling method of a vehicle provided by the present application, i.e., the operating principle of the fueling control device of the vehicle as illustrated in FIG. 1a. This processing flow includes:

Step 301: determining, by the fueling control device in the vehicle, whether the vehicle needs to be filled with fuel.

The fueling control device can judge whether the vehicle needs to be filled with fuel in various ways. In an embodiment, it is determined that the vehicle needs to be filled with fuel in the case that a liquid level signal is received from the on-board network and the liquid level signal indicates that the liquid level of the fuel tank of the vehicle is lower than the predetermined liquid level, where the liquid level signal of the on-board network comes from the liquid level sensor in the fuel tank of the vehicle.

In another embodiment, it is determined that the vehicle needs to be filled with fuel in the case that a load signal is received from the on-board network and the load signal indicates that the loading weight of the vehicle exceeds the predetermined deadweight, where the load signal of the on-board network comes from the load sensor of the vehicle.

In yet another embodiment, it can also be determined that the vehicle needs to be filled with fuel when receiving a fueling indication from the outside of the vehicle, e.g., receiving the fueling indication input by the user via the human machine interface of the vehicle, or receiving the fueling indication from the client in the mobile terminal of the user, or receiving the fueling indication from a terminal at the network side.

Step 302: obtaining the information of vehicle status of the vehicle when determining that the vehicle needs to be filled with fuel.

The fueling control device can obtain the information of vehicle status from the on-board network, where the information of vehicle status at least includes: the average fuel consumption per 100 kilometers, the current weight and the filled fuel amount of the vehicle.

Step 303: sending a fueling request to the fueling management system, where the fueling request includes the information of the identifier of the vehicle and the information of vehicle status, and the identifier of the vehicle includes: the vehicle identification code of the vehicle and/or the vehicle identifier assigned by the fueling management system to the vehicle.

Step 304: receiving a feedback message from the fueling management system, where the feedback message includes the information of the position of the fueling device.

Step 305: prompting the vehicle to drive to the fueling device indicated by the position of the fueling device, to obtain the fuel offered by the fueling device.

In some other embodiments of the present application, after the step 303, the fueling control device further feeds back the information of the driving route of the vehicle in response to the request of the fueling management system, which includes:

Step 3031: receiving a request of obtaining the driving route from the fueling management system;

Step 3032: prompting a user to input the information of the driving route, and receiving the information of the driving route input by the user via an on-board Human Machine Interface (HMI) device or an on-board navigation device; or sending a message requesting to obtain the driving route to a client in a mobile terminal of the user, and receiving the information of the driving route from the client in the mobile terminal of the user;

Step 3033: sending the obtained information of the driving route to the fueling management system.

Through the above processing steps, the fueling control device feeds back the information of the driving route of the vehicle to the fueling management system.

In some other embodiments of the present application, the fueling control device of the vehicle receives a payment message from the fueling management system, and makes a payment according to the payment message.

With the operating principles of the system as well as the fueling control device at the vehicle side and the fueling management system at the network side therein as described above and as shown in FIG. 1a, when determining that the vehicle needs to be filled with fuel, the fueling control device of the vehicle obtains the driving route information and the information of vehicle status of the vehicle, and sends a fueling request to the fueling management system at the network side, where the fueling request includes the identifier of the vehicle and the information of vehicle status; the fueling management system determines the current position of the vehicle and the driving route of the vehicle, determines the fuel amount to be filled according to the information of vehicle status and the driving route of the vehicle, assigns a fueling device to the vehicle according to the current position of the vehicle and the preset position rule, feeds back the position information of the fueling device to the vehicle, sends the identifier of the vehicle and the information of the fuel amount to be filled to the fueling device so that the fueling device offers the fuel to the vehicle indicated by the identifier of the vehicle according to the information of the fuel amount to be filled. In the scheme of the present application, the fueling control device of the vehicle determines the fuel amount required by the vehicle to drive in the driving route according to the driving route information of the vehicle and the information of vehicle status, and sends the information of the determined fuel amount to be filled and the information of the current position of the vehicle to the fueling management system at the network side; the fueling management system assigns a fueling device to the vehicle according to the current position of the vehicle, and sends the information of the fuel amount to be filled to the assigned fueling device; and the fueling device offers the corresponding fuel to the vehicle according to the information of the fuel amount to be filled, which can plan the fuel amount to be filled for the vehicle automatically and effectively and obtain the corresponding fuel, so as to solve the problem that the fuel amount to be filled of the vehicle can not be planned automatically, reasonably and effectively in the prior art.

An embodiment of the present application further provides a device for automatically fueling a vehicle.

Figure 4:
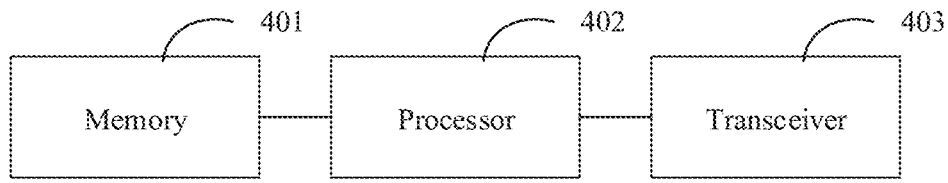
FIG. 4 is a structural block diagram of a device for automatically fueling a vehicle provided by some embodiments of the present application.

FIG. 4 shows a structural block diagram of a device for automatically fueling a vehicle provided by the embodiment of the present application, where the device is at the network side, corresponds to the fueling management system 11 as shown in FIG. 1a, and includes: a memory 401, a processor 402 and a transceiver 403;

the memory 401 is configured to store at least one machine executable instruction;

the processor 402 is configured to execute the at least one instruction stored in the memory 401 to: receive, through the transceiver 403, a fueling request from the vehicle, wherein the fueling request comprises information of an identifier of the vehicle and information of vehicle status; determine a current position of the vehicle and a driving route of the vehicle; determine fuel amount to be filled according to the information of vehicle status and the driving route of the vehicle; assign a fueling device which conforms to a preset position rule to the vehicle according to the current position of the vehicle and the preset position rule; send, through the transceiver 403, a feedback message carrying position information of the fueling device to the vehicle, so that the vehicle drives to the fueling device indicated by a position of the fueling device; and send, through the transceiver 403, information of the fuel amount to be filled and the information of the identifier of the vehicle to the fueling device so that the fueling device offers fuel according to the information of the fuel amount to be filled to the vehicle indicated by the identifier of the vehicle; and the transceiver 403 is configured to receive and send information according to invoking by the processor 402.

In some embodiments of the present application, the processor executes the at least one instruction to determine the current position of the vehicle, which includes: determine the current position of the vehicle according to a signal fed back from a GPS positioning tracker on the vehicle; or send a position request message to the vehicle, and receive the information of the current position of the vehicle fed back from the vehicle.

In some embodiments of the present application, the processor executes the at least one instruction to determine the driving route of the vehicle, which includes: judge whether the current position of the vehicle is included on a prestored historical driving route of the vehicle according to the identifier and the current position of the vehicle; in the case that the current position of the vehicle is included on the prestored driving route, if the current position of the vehicle is at one of two ends of the prestored driving route, determine the prestored driving route as the obtained driving route; if the current position of the vehicle is not at one of two ends of the prestored driving route, determine a route between the current position of the vehicle and an end of the prestored driving route in a driving direction of the vehicle as the obtained driving route according to the driving direction of the vehicle; in the case that the current position of the vehicle is not included on the prestored driving route, send a request of obtaining the driving route to the vehicle and receive the information of the driving route fed back by the vehicle.

In some embodiments of the present application, the information of vehicle status at least includes: information of average fuel consumption per 100 kilometers, current weight and filled fuel amount of the vehicle; then the processor executes the at least one instruction to determine the fuel amount to be filled, which includes: determine a distance length of the driving route; determine the required fuel amount according to a function relationship among the average fuel consumption per 100 kilometers of the vehicle, the current weight of the vehicle and the distance length of the driving route; and determine the fuel amount to be filled according to the determined required fuel amount and the filled fuel amount of the vehicle.

In some embodiments of the present application, the processor executes the at least one instruction to further determine the current driving time of the vehicle; then the processor executes the at least one instruction to determine the required fuel amount, which includes: determine the required fuel amount according to a function relationship among the average fuel consumption per 100 kilometers of the vehicle, the current weight of the vehicle, the distance length of the driving route and the driving time.

In some embodiments of the present application, the processor executes the at least one instruction to further obtain the information of weather condition; then the processor executes the at least one instruction to determine the required fuel amount, which includes: determine the required fuel amount according to a function relationship among the average fuel consumption per 100 kilometers of the vehicle, the current weight of the vehicle, the distance length of the driving route and the weather condition.

In some embodiments of the present application, the processor executes the at least one instruction to further obtain the information of roadway condition of the driving route, which includes at least one of: roadway speed limit information, roadway traffic control information, roadway closure information, roadway congestion information; then the processor executes the at least one instruction to determine the required fuel amount, which includes: determine the required fuel amount according to a function relationship among the average fuel consumption per 100 kilometers of the vehicle, the current weight of the vehicle, the distance length of the driving route and the roadway condition of the driving route.

In some embodiments of the present application, the information of vehicle status further includes: the information of the deadweight of the vehicle; then the processor executes the at least one instruction to determine the required fuel amount, which includes: determine the required fuel amount according to a function relationship among the average fuel consumption per 100 kilometers of the vehicle, the current weight of the vehicle, the deadweight of the vehicle and the distance length of the driving route.

In some embodiments of the present application, the processor executes the at least one instruction to further determine the actual fuel consumption after each fueling in a preset update cycle; compare the required fuel amount determined each time with the actual fuel consumption; and update the function relationship for determining the required fuel amount according to a comparison result.

In some embodiments of the present application, the processor executes the at least one instruction to assign the fueling device to the vehicle, which includes: obtain prestored position of each of at least one fueling device, and assign the fueling device which conforms to the preset position rule to the vehicle; wherein the preset position rule includes: a fueling device closest to the current position of the vehicle; or a random fueling device in the at least one fueling device of which the distance from the current position of the vehicle is less than a preset distance; or a fueling device of a pre-determined operator closest to the current position of the vehicle.

In some embodiments of the present application, the processor executes the at least one instruction to further obtain dynamic operation condition information of each of the at least one fueling device, wherein the dynamic operation condition information includes a fueling queue length of the fueling device; then the processor executes the at least one instruction to assign the fueling device to the vehicle, which includes: assign a fueling device which conforms to the preset position rule and of which the fueling queue length is less than a preset fueling queue length to the vehicle.

In some embodiments of the present application, the processor executes the at least one instruction to further determine the payment information corresponding to the fuel amount to be filled; and send a message comprising the payment information to the vehicle.

Figure 5:
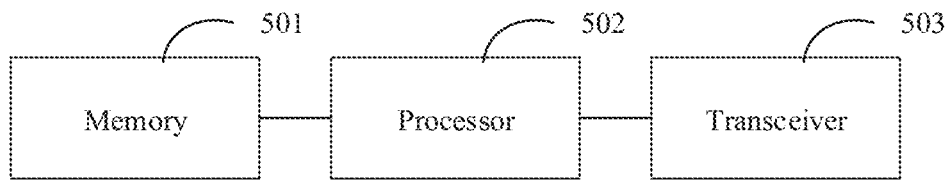
FIG. 5 is a structural block diagram of a device for automatically fueling a vehicle provided by some embodiments of the present application.

Some embodiments of the present application further provide a device for automatically fueling a vehicle, as shown in FIG. 5, where the device is in the vehicle, corresponds to the fueling control device 13 as shown in FIG. 1a, and includes: a memory 501, a processor 502 and a transceiver 503;

the memory is configured to store at least one machine executable instruction;

the processor is configured to execute the at least one instruction stored in the memory to: determine whether the vehicle needs to be filled with fuel; obtain information of vehicle status of the vehicle when determining that the vehicle needs to be filled with fuel; send, through the transceiver 503, a fueling request to a fueling management system, wherein the fueling request comprises information of an identifier of the vehicle and the information of vehicle status; receive, through the transceiver 503, a feedback message from the fueling management system, wherein the feedback message comprises information of a position of a fueling device; and prompt the vehicle to drive to the fueling device indicated by the position of the fueling device, to obtain fuel offered by the fueling device; and the transceiver 503 is configured to receive and send information according to invoking by the processor.

In some embodiments of the present application, the processor executes the at least one instruction to determine whether the vehicle needs to be filled with fuel, which includes: receive a liquid level signal from an on-board network, and determine that the vehicle needs to be filled with fuel in the case that the liquid level signal indicates that a liquid level of an fuel tank of the vehicle is lower than a predetermined liquid level; or receive a load signal from the on-board network, and determine that the vehicle needs to be filled with fuel in the case that the load signal indicates that the loading weight of the vehicle exceeds predetermined deadweight; or determine that the vehicle needs to be filled with fuel when receiving a fueling indication from the outside of the vehicle.

In some embodiments of the present application, the processor executes the at least one instruction to further receive a request of obtaining a driving route from the fueling management system; prompt a user to input the information of the driving route, and receive the information of the driving route input by the user via an on-board Human Machine Interface (HMI) device or an on-board navigation device; or send a message requesting to obtain the driving route to a client in a mobile terminal of the user, and receive the information of the driving route from the client in the mobile terminal of the user; and send the obtained information of the driving route to the fueling management system.

In some embodiments of the present application, the processor executes the at least one instruction to further receive a payment message from the fueling management system; and make a payment according to the payment message.

With the solution for automatic fueling of the vehicle provided by the present application, when determining that the vehicle needs to be filled with fuel, the fueling control device of the vehicle obtains the driving route information and the information of vehicle status of the vehicle, and sends a fueling request to the fueling management system at the network side, where the fueling request includes the identifier of the vehicle and the information of vehicle status; the fueling management system determines the current position of the vehicle and the driving route of the vehicle, determines the fuel amount to be filled according to the information of vehicle status and the driving route of the vehicle, assigns a fueling device to the vehicle according to the current position of the vehicle and the preset position rule, feeds back the position information of the fueling device to the vehicle, sends the identifier of the vehicle and the information of the fuel amount to be filled to the fueling device so that the fueling device offers the fuel to the vehicle indicated by the identifier of the vehicle according to the information of the fuel amount to be filled. In the scheme of the present application, the fueling control device of the vehicle determines the fuel amount required by the vehicle to drive in the driving route according to the driving route information of the vehicle and the information of vehicle status, and sends the information of the determined fuel amount to be filled and the information of the current position of the vehicle to the fueling management system at the network side; the fueling management system assigns a fueling device to the vehicle according to the current position of the vehicle, and sends the information of the fuel amount to be filled to the assigned fueling device; and the fueling device offers the corresponding fuel to the vehicle according to the information of the fuel amount to be filled, which can plan the required fuel amount for the vehicle automatically and effectively and obtain the corresponding fuel, so as to solve the problem that the filled fuel amount of the vehicle cannot be planned automatically, reasonably and effectively in the prior art.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the application without departing from the spirit and scope of the application. Thus the application is also intended to encompass these modifications and variations therein as long as these modifications and variations come into the scope of the claims of the application and their equivalents.

What is claimed is:

1. A method of fueling a vehicle, comprising:
   receiving, by a computer located external to the vehicle, a current position of the vehicle and fuel consumption related information of the vehicle, wherein the vehicle is operating along a driving route;
   determining a fuel amount to be filled according to the fuel consumption related information and information related to the driving route of the vehicle;
   assigning a fueling device to the vehicle based on the current position of the vehicle; and
   sending, to the vehicle, a message that includes position information of the fueling device to the vehicle, wherein the vehicle is caused to drive to the position information of the fueling device.

2. The method of claim 1, wherein the fuel consumption related information includes an average fuel consumption and a current weight of the vehicle.

3. The method of claim 2, wherein the fuel amount to be filled in the vehicle is determined based on the average fuel consumption, the current weight of the vehicle, and a length of the driving route.

4. The method of claim 2, wherein the fuel amount to be filled in the vehicle is determined based on the average fuel consumption, the current weight of the vehicle, a length of the driving route, and a weather condition.

5. The method of claim 2, wherein the fuel amount to be filled in the vehicle is determined based on the average fuel consumption, the current weight of the vehicle, a length of the driving route, and a roadway condition of the driving route, wherein the roadway condition includes roadway speed limit information, roadway traffic control information, roadway closure information, or roadway congestion information.

6. The method of claim 1, further comprising:
   determining actual fuel consumption after fueling of the vehicle by the fueling device;
   comparing the fuel amount to be filled in the vehicle with the actual fuel consumption by the vehicle; and
   updating, based on the comparing, a function relationship for determining the fuel amount to be filled.

7. The method of claim 1, further comprising:
   sending a request to obtain the information related to the driving route of the vehicle in response to determining that the current position of the vehicle is not included on a prestored driving route.

8. The method of claim 1, wherein the receiving includes receiving an identifier of the vehicle, and wherein the method further comprises:
   sending, to the fueling device, the identifier of the vehicle and the fuel amount to be filled, wherein the fueling device is caused to offer fuel to the vehicle indicated by the identifier according to the fuel amount to be filled.

9. A computer, comprising:
   a processor and a memory, wherein the processor is configured to execute instructions stored in the memory to:
   receive a current position of a vehicle and fuel consumption related information of the vehicle, wherein the vehicle is operating along a driving route, wherein the computer is located external to the vehicle;
   determine a fuel amount to be filled according to the fuel consumption related information and information related to the driving route of the vehicle;
   assign a fueling device to the vehicle based on the current position of the vehicle; and
   send, to the vehicle, a message that includes position information of the fueling device to the vehicle, wherein the vehicle is caused to drive to the position information of the fueling device.

10. The computer of claim 9, wherein the fueling device is assigned to the vehicle based on a rule that identifies the fueling device as being closest to the current position of the vehicle.

11. The computer of claim 9, wherein the fueling device is assigned to the vehicle based on a rule that randomly identifies the fueling device as being within a preset distance of the current position of the vehicle.

12. The computer of claim 9, wherein the fueling device is assigned to the vehicle based on a rule that identifies the fueling device as being associated with a pre-determined operator and that is closest to the current position of the vehicle.

13. A method of fueling a vehicle, comprising:
   sending, by a first computer located in the vehicle to a second computer located external to the vehicle, a current position of the vehicle and fuel consumption related information of the vehicle, wherein the vehicle is operating along a driving route;
   receiving a message comprising position information of a fueling device where the vehicle is to drive to obtain a fuel amount to be filled, wherein the fuel amount to be filled is based on the fuel consumption related information and information related to the driving route of the vehicle; and causing the vehicle to drive to the fueling device indicated by the position information of the fueling device.

14. The method of claim 13, wherein the sending the fuel consumption related information of the vehicle is performed in response to determining by the first computer that the vehicle needs to be filled with fuel.

15. The method of claim 13, further comprising:
receiving, by the first computer from the second computer, a request for obtaining the information related to the driving route; and
sending a prompt to obtain the information related to the driving route;
receiving the information related to the driving route; and
sending to the second computer the information related to the driving route.

16. A first computer located in a vehicle, comprising:
a processor and a memory, wherein the processor is configured to execute instructions stored in the memory to:
send, by the first computer located in the vehicle to a second computer located external to the vehicle, a current position of the vehicle and fuel consumption related information of the vehicle, wherein the vehicle is operating along a driving route;
receive a message comprising position information of a fueling device where the vehicle is to drive to obtain a fuel amount to be filled, wherein the fuel amount to be filled is based on the fuel consumption related information and information related to the driving route of the vehicle; and
cause the vehicle to drive to the fueling device indicated by the position information of the fueling device.

17. The first computer of claim 16, wherein the fuel consumption related information includes an average fuel consumption, a current weight of the vehicle, and a current fuel amount in the vehicle.

18. The first computer of claim 16, wherein the fueling device is closest to the current position of the vehicle.

19. The first computer of claim 16, wherein the fueling device is within a preset distance of the current position of the vehicle.

20. The first computer of claim 16, wherein the fueling device is associated with a pre-determined operator and is closest to the current position of the vehicle.

* * * * *